(12) United States Patent
Aoyama et al.

(10) Patent No.: US 9,403,393 B2
(45) Date of Patent: Aug. 2, 2016

(54) RECORDING METHOD

(71) Applicant: Seiko Epson Corporation, Tokyo (JP)

(72) Inventors: Tetsuya Aoyama, Shiojiri (JP); Akiko Kawase, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/503,491

(22) Filed: Oct. 1, 2014

(65) Prior Publication Data

US 2015/0091974 A1    Apr. 2, 2015

(30) Foreign Application Priority Data

Oct. 2, 2013    (JP) .................... 2013-207077
Jun. 17, 2014    (JP) .................... 2014-124056

(51) Int. Cl.
| | | |
|---|---|---|
| B41M 5/00 | (2006.01) | |
| B41J 11/00 | (2006.01) | |
| B41J 2/01 | (2006.01) | |
| B41J 2/21 | (2006.01) | |

(52) U.S. Cl.
CPC ............. B41M 5/0017 (2013.01); B41J 2/01 (2013.01); B41J 2/2114 (2013.01); B41J 11/0015 (2013.01); B41M 5/0011 (2013.01)

(58) Field of Classification Search
CPC .... B41J 2/2114; B41J 2/2117; B41J 11/0015; B41M 5/0011; B41M 5/0017
See application file for complete search history.

(56) References Cited

U.S. PATENT DOCUMENTS

| 6,454,402 B1 * | 9/2002 | Koitabashi ............. B41J 2/2114 347/100 |
|---|---|---|
| 2009/0153613 A1 | 6/2009 | Yamanobe |
| 2009/0233061 A1 | 9/2009 | Irita |

FOREIGN PATENT DOCUMENTS

JP         2009-143146 A    7/2009

OTHER PUBLICATIONS

Extended European Search Report for Application No. EP 14 18 6869 dated Jan. 20, 2015 (5 pages).

* cited by examiner

*Primary Examiner* — Justin Seo
(74) *Attorney, Agent, or Firm* — Harness, Dickey & Pierce, P.L.C.

(57) ABSTRACT

A recording method includes first coating a treatment liquid A to a recording medium, a second coating a treatment liquid B to the recording medium after the first coating, and a discharging an ink composition including a coloring material to the recording medium by discharging from a nozzle after the second coating, and the treatment liquid A adjusts wettability of the treatment liquid B to the recording medium and includes at least any one of a resin and inorganic oxide fine particles, and the treatment liquid B thickens or insolubilizes the ink composition and includes at least any one of a polyvalent metal salt, an organic acid, and an organic acid salt.

13 Claims, 1 Drawing Sheet

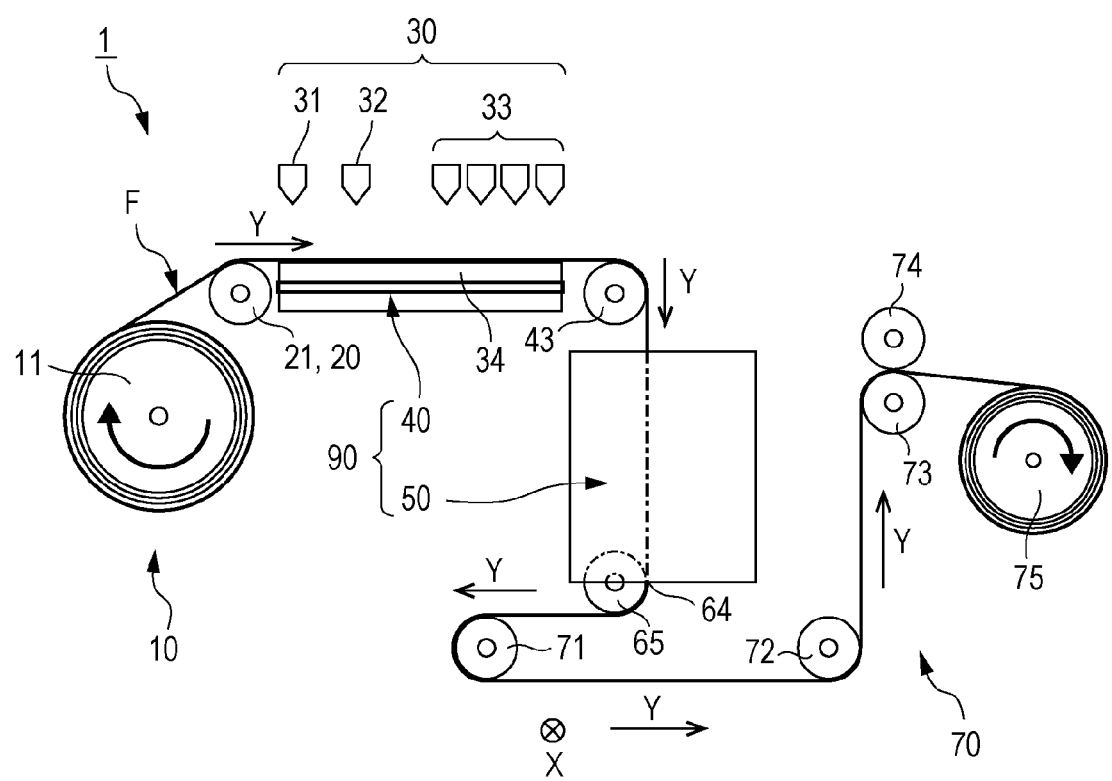

RECORDING METHOD

BACKGROUND

1. Technical Field

The present invention relates to a recording method.

2. Related Art

In the ink jet recording method, a high-resolution image can be recorded with a relatively simple apparatus, and rapid development has been achieved in various fields.

JP-A-2009-143146 discloses an ink jet recording apparatus for recording an image using an ink containing a coloring material on a recording medium, the ink jet recording apparatus including: a first treatment agent applying device which applies a first treatment agent having a function of suppressing a liquid from penetrating into the recording medium; a second treatment agent applying device which applies a second treatment agent having a function of aggregating a coloring material in the ink or a function of thickening ink dots; an image processing device for converting input image data into dot data; and an ink droplet ejection head for ejecting ink droplets to the recording medium according to the dot data converted by the image processing device, for the purpose of providing an ink jet recording apparatus and an image recording method in which abnormality such as curling is not generated and image recording is preferably performed.

In general, as in JP-A-2009-143146, after applying a treatment agent which thickens or insolubilizes the ink composition to a recording medium in advance, the ink composition is attached to the recording medium, and thus, it is possible to prevent unevenness in solid printing or bleeding of the ink composition, it is possible to draw homogeneous lines and fine images, and thus, the image quality can be improved.

However, in a case of applying the treatment agent which thickens or insolubilizes the ink composition, an organic solvent for adjusting wettability is preferably included in a treatment liquid B to uniformly coat the treatment agent on the recording medium. However, since, when an organic solvent is added to the treatment liquid B, the solubility of the polyvalent metal salt is reduced, the amount of the organic solvent is required to be limited, and therefore the wettability of the treatment liquid B to the recording medium is insufficient, and there is a problem in that cissing is generated on the surface of a non-absorbing recording medium, in particular. Due to generation of cissing of the treatment liquid B on the surface of the recording medium, there is a problem that unevenness in solid printing or bleeding in the ink composition attached to the recording medium treated with the treatment liquid B occurs, and the image quality of the obtained recorded material is reduced.

In addition, by using the treatment agent which thickens or insolubilizes the ink composition, there is also a problem in that the adhesiveness between the ink composition and the recording medium is reduced. On the other hand, if a component which improves the adhesiveness is included in the treatment agent in order to improve the adhesiveness, there are problems in that the solubility of the component which thickens or insolubilizes the ink composition in the treatment agent is reduced, and the improvement in an image quality by the treatment agent which thickens or insolubilizes the ink composition is not achieved. For this reason, there is a trade-off relationship between the improvement in an image quality due to the treatment agent which thickens or insolubilizes the ink composition and the improvement in the adhesiveness of the ink composition.

SUMMARY

An advantage of some aspects of the invention is to provide a recording method in which a recorded material which is excellent in image quality and adhesiveness of an ink composition can be obtained.

The inventors use two kinds of a treatment liquid having a predetermined component, thereby completing the invention. That is, the invention is as follows.

[1] A recording method includes first coating a treatment liquid A on a recording medium, second coating a treatment liquid B on the recording medium after the first coating, and discharging an ink composition including a coloring material to the recording medium by discharging from a nozzle after the second coating, in which the treatment liquid A adjusts wettability of the treatment liquid B to the recording medium and includes at least any one of a resin and inorganic oxide fine particles, and the treatment liquid B thickens or insolubilizes the ink composition and includes at least any one of a polyvalent metal salt, an organic acid, and an organic acid salt.

[2] The recording method according to [1], in which the treatment liquid A includes a resin, and a glass transition temperature of the resin is 29° C. or lower.

[3] The recording method according to [1] or [2], in which the treatment liquid A includes the resin, and a SP value of the resin is 14 or less.

[4] The recording method according to any one of [1] to [3], in which the treatment liquid B includes the polyvalent metal salt.

[5] The recording method according to any one of [1] to [4], in which the treatment liquid B further includes a water-soluble organic solvent.

[6] The recording method according to any one of [1] to [5], in which the recording medium is a non-absorbent recording medium or a low absorbent recording medium.

[7] The recording method according to any one of [1] to [6], in which a surface tension of the treatment liquid B is 18 mN/m to 45 mN/m at 25° C.

[8] The recording method according to any one of [1] to [7], in which a viscosity of the treatment liquid B is 1 mPa·s to 10 mPa·s at 25° C.

[9] The recording method according to any one of [1] to [8], in which in the first coating, at least any one of the resin and the inorganic oxide fine particles is coated at 0.01 g/m$^2$ to 1.0 g/m$^2$.

[10] The recording method according to any one of [1] to [9], in which a concentration of cations of at least any one of the polyvalent metal salt and the organic acid in the treatment liquid B is 0.08 mol/L or less.

[11] The recording method according to any one of [1] to [10], in which in the second coating, the treatment liquid B is coated on the recording medium by an ink jet method.

[12] The recording method according to any one of [1] to [11], in which in the second coating, the treatment liquid B is coated on the recording medium by an ink jet method using a line head.

[13] The recording method according to any one of [1] to [12], further including drying the treatment liquid A coated on the recording medium between the first coating and the second coating.

[14] The recording method according to any one of [1] to [13], in which in the second coating, a total of at least one of the polyvalent metal salt, the organic acid, and the organic acid salt is coated at 0.01 g/m$^2$ to 0.5 g/m$^2$ as a solid content.

BRIEF DESCRIPTION OF THE DRAWINGS

The invention will be described with reference to the accompanying drawings, wherein like numbers reference like elements.

FIGURE is a side view showing a whole scheme of an example of an ink jet recording apparatus obtained by using the present embodiment.

DESCRIPTION OF EXEMPLARY EMBODIMENTS

Hereinafter, an embodiment for carrying out the invention (hereinafter, referred to as "the embodiment") will be described in detail with reference to the drawings as necessary. The invention is not limited thereto, and various modifications are possible without departing from the gist of the invention. Moreover, in the drawings, the same reference numerals are given to the same element, and overlapping descriptions will not be repeated. In addition, a positional relationship such as upward, downward, leftward and rightward is based on the positional relationship shown in the drawings unless stated otherwise. Moreover, the dimensional ratio of the drawings is not limited to the ratio shown.

Recording Method

The recording method according to the embodiment is provided with a first coating step of coating a treatment liquid A on a recording medium, a second coating step of coating a treatment liquid B on the recording medium after the first coating step, and a discharging step of attaching an ink composition including a coloring material to the recording medium by discharging from a nozzle after the second coating step, and the treatment liquid A adjusts wettability of the treatment liquid B to the recording medium and includes at least any one of a resin and inorganic oxide fine particles, and the treatment liquid B thickens or insolubilizes the ink composition and includes at least any one of a polyvalent metal salt, an organic acid, and an organic acid salt.

In the recording method according to the embodiment, the treatment liquid A which adjusts the wettability of the treatment liquid B to the recording medium and the treatment liquid B including a component (coagulant component) which thickens or insolubilizes the ink composition are coated in different coating steps separately. Thus, while maintaining the image quality improving effect obtained by using the treatment liquid B, it is possible to further improve the image quality by suppressing the generation of cissing on the recording medium, and it is possible to improve the adhesiveness of the ink composition to the recording medium. As a result, by the recording method according to the embodiment, a recorded material which is excellent in the image quality and the adhesiveness of the ink composition can be obtained.

FIGURE is a side view showing a whole scheme of an example of an ink jet recording apparatus 1 obtained by using the embodiment. As shown in the FIGURE, the ink jet recording apparatus 1 is equipped with a feeding portion 10 of a recording medium F, and a transporting portion 20, a recording portion 30, a drying device 90, and a discharging portion 70. In addition, the ink jet recording apparatus 1 is also equipped with a preheater not shown in the FIGURE, and the recording medium F is heated from the beginning.

Among these, the drying device 90 has a first drying portion 40 which performs a first drying step and a second drying step, and a second drying portion 50 which dries a recorded medium obtained by the recording method according to the embodiment.

In addition, the feeding portion 10 is provided so as to be able to feed the recording medium F in a roll form to the transporting portion 20. Specifically, the feeding portion 10 has a roll medium holder 11, and the roll medium holder 11 holds the recording medium F in a roll form. Then, the feeding portion 10 is configured so as to be able to feed the recording medium F to the transporting portion 20 on the downstream side in the transporting direction Y by rotationally moving the recording medium F in a roll form.

Furthermore, the transporting portion 20 is provided so as to be able to feed the recording medium F transported from the feeding portion 10 to the recording portion 30. Specifically, the transporting portion 20 has a first transporting roller 21, and is configured so as to be able to further transport the recording medium F which is transported to the recording portion 30 on the downstream side in the transporting direction Y.

In addition, the recording portion 30 is provided so as to be able to record by coating the treatment liquids A and B on the recording medium F transported from the transporting portion 20 and discharging the ink composition. Specifically, the recording portion 30 is equipped with a head 31 which performs the first coating step, a head 32 which performs the second coating step, a recording head 33 which performs the discharging step, and a platen 34 as a medium support portion.

Among these, the platen 34 is provided so as to be able to support the recording medium F from the rear surface. In addition, the platen 34 is provided with the first drying portion 40 which dries the treatment liquids A and B coated on the recording medium F and the ink composition discharged on the recording medium F. Furthermore, a second transporting roller 43 is provided on the downstream side in the transporting direction Y of the platen 34. Furthermore, the second transporting roller 43 is configured so as to be able to transport the recording medium F which is recorded to the second drying portion 50 which is on the downstream side in the transporting direction Y.

In addition, the second drying portion 50 is configured so as to be able to further dry the treatment liquids A and B coated on the recording medium F and the ink composition discharged on the recording medium F. Furthermore, a third transporting roller 65 is provided near an outlet 64 of the second drying portion 50. The third transporting roller 65 is arranged so as to be come into contact with the rear surface of the recording medium F, and is configured so as to be able to transport the recording medium F to the discharging portion 70 which is on the downstream side in the transporting direction Y.

Furthermore, the discharging portion 70 is provided on the downstream side in the transporting direction Y so as to be able to further transport the recording medium F which is transported from the second drying portion 50, and discharge to the outside of the ink jet recording apparatus 1. Specifically, the discharging portion 70 has a fourth transporting roller 71, a fifth transporting roller 72, a sixth transporting roller 73, a seventh transporting roller 74, and a winding roller 75. Among these, the fourth transporting roller 71, and the fifth transporting roller 72 are arranged so as to be come into contact with the front surface of the recording medium F. In addition, the sixth transporting roller 73 and the seventh transporting roller 74 are arranged so as to form a pair. Then, the recording medium F discharged by the sixth transporting roller 73 and the seventh transporting roller 74 is provided so as to be wound by the winding roller 75.

First Coating Step

The first coating step is a step of coating the treatment liquid A on the recording medium. The coating method is not particularly limited, and for example, a roller coating, a spray coating, and an ink jet coating can be used. Among these, the treatment liquid A is preferably coated on the recording medium by the ink jet method. By this, since it is possible to selectively coat only a part needed, there is a tendency that reduction of the used fluid amount, that is, reduction of printing costs and the shortening of the drying time become excellent, and thus, it is preferable. In addition, the treatment liquid A is preferably coated on the recording medium by the ink jet method using a line head. By this, there is a tendency that the improvement of the dot landing accuracy and the shortening of the printing time become excellent, and thus, this is further preferable.

The attaching amount (coating amount) of the total of at least one of the resin and the inorganic oxide fine particles with respect to the recording medium preferably is 0.01 g/m$^2$ or greater, more preferably 0.05 g/m$^2$ or greater, even more preferably 0.1 g/m$^2$ or greater, and particularly preferably 0.5 g/m$^2$ or greater. In addition, the upper limit is preferably 1.5 g/m$^2$ or less, more preferably 1.3 g/m$^2$ or less, even more preferably 1.2 g/m$^2$ or less, and particularly preferably 1.0 g/m$^2$ or less. When the attaching amount is in the above-described range, it is possible that at least one of the resin and the inorganic oxide fine particles produces a uniform coating film, and it is possible to eliminate cissing of the treatment liquid B, and thus, it is more excellent.

On the other hand, while also ensuring uniformity of the coating film and elimination of cissing of the treatment liquid B, in terms of being capable of increasing the drying rate of the treatment liquid A and shortening the coating step time, and reduction of the used amount of the treatment liquid A and harmful effects (for example, the texture of the region where the recording medium treatment liquid A is attached changes as compared to the region where the recording medium treatment liquid A is not attached, or the like) due to the provision of the coating film of the treatment liquid A, the upper limit of the attaching amount is preferably 0.5 g/m$^2$ or less, more preferably 0.3 g/m$^2$ or less, and even more preferably 0.2 g/m$^2$ or less.

The above-described attaching amount is a value in the region in which the second coating step and the discharging step described below are performed.

Treatment Liquid A

The treatment liquid A is a treatment liquid for uniformly coating the treatment liquid B described below on a recording medium and for applying the adhesiveness between the ink composition and the recording medium, and includes at least one of the resin and the inorganic oxide fine particles, and if necessary, an organic solvent. The treatment liquid A makes such that by producing a uniform coating film on the recording medium with the resin or the inorganic oxide fine particles, treatment liquid B described below can be uniformly coated on the resin layer or in the inorganic oxide fine particle layer. In addition, the treatment liquid A improve the adhesiveness of the ink composition by including the resin.

"Adjusting the wettability" refers to that when the treatment liquid B is coated on the recording medium, the spreading manner of the treatment liquid B on the recording medium is different in the recording medium on which the first coating step is performed using the treatment liquid A and the recording medium before the first coating step is performed. "The spreading manner is different", for example, refers to that the diameters or the areas in the recording surface direction of the recording medium of dots by droplets on the recording medium when the droplets of a predetermined liquid amount of the treatment liquid B is ink jet-coated are different. It is preferable that the recording medium on which the first coating step is performed using the treatment liquid A have greater dot diameters or areas when the treatment liquid B is coated than in the recording medium before the first coating step is performed. When the dot diameter or the area is great during the treatment liquid B being coated, the image quality tends to be improved. It is possible to adjust the wettability according to the components of the treatment liquid A or the conditions of the first coating step.

Moreover, from the viewpoint of uniformly coating the treatment liquid B on the recording medium to prevent defects such as unevenness in solid printing or bleeding, an organic solvent is preferably added to the treatment liquid B. However, when an organic solvent is added to the treatment liquid B, the solubility of the coagulant component in the treatment liquid B is reduced. On the other hand, from the viewpoint of image quality improvement, a predetermined amount of the coagulant component is preferably dissolved. That is, there is a problem of trade-off between uniformly coating and image quality improvement.

To solve this problem, the treatment liquid A is used in the embodiment. That is, in a case where the treatment liquid A includes the resin, it is possible to produce a uniform resin film on the recording medium, and by this, the treatment liquid B can be uniformly laminated on the resin layer. In addition, in a case where the treatment liquid A includes the inorganic oxide fine particles, it is possible to produce a uniform fine particle film on the recording medium, the fine particle film having fine voids acts as a receptive layer, and thus, it is possible to uniformly coat the treatment liquid B. By using the treatment liquid A in this manner, it is possible to uniformly coat the treatment liquid B, and the generation of unevenness in solid printing during the reaction of the treatment liquid B and the ink composition is suppressed.

Moreover, the recording medium may be covered with the resin film, and the inorganic oxide fine particles may form a receptive layer on the recording medium.

The treatment liquid A preferably includes a penetrating solvent. By using the penetrating solvent, there is a tendency that the treatment liquid A can be uniformly coated on the recording medium. In addition, the treatment liquid A may also include other optional components. As the other optional components which are not particularly limited, general components of ink jet inks can be exemplified. The content of these penetrating solvents and the other optional components can be the same as the content which can be used in typical ink compositions.

Moreover, as the penetrating agents, which are not particularly limited, alkyl ethers of polyol (glycol ethers) and 1,2-alkyldiol are preferably exemplified. Examples of the glycol ether, which are not particularly limited, include ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxy butanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, propylene glycol monobutyl ether, and dipropylene glycol monobutyl ether. In addition, examples of the above-described 1,2-alkyldiol, which are not particularly limited, include 1,2-pentanediol and 1,2-hexanediol. In addition to these, diols having a linear hydrocarbon such as 1,3-propanediol, 1,4-butanediol, 1,5-pentanediol, 1,6-hexanediol, 1,7-heptanediol and 1,8-octanediol can also be exemplified.

The penetrating agent may be used alone or two or more kinds may be used in combination.

By using the treatment liquid B described below, it is possible to prevent unevenness in solid printing or bleeding of the ink composition which is attached to the recording medium after the second coating step, it is possible to draw homogeneous lines and fine images, and thus, the image quality can be improved. However, in general, the treatment liquid which thickens or insolubilizes the ink composition has poor wettability to the recording medium, when only the treatment liquid is used, cissing is generated on the recording medium, and when the ink composition is attached to such a recording medium, unevenness or ruled line balls (ruled line pattern as balls are connected) can occur. Therefore, by adjusting the wettability of the treatment liquid B to the recording medium using the treatment liquid A, an image quality improvement effect due to the treatment liquid B is exhibited.

Resin

By including the resin, it is possible to change the wettability of the treatment liquid B to the recording medium, or to improve the adhesiveness of the ink composition. As the resin, for example, a resin in which a polymer component is dispersed or dissolved in a solvent in the form of an emulsion can be used. Among these, a resin dispersed or dissolved in the form of an emulsion is preferable, and the resin dispersed is particularly preferable. There is a tendency that by using such a resin, a recorded material having excellent waterproofness and abrasion resistance can be obtained.

Examples of the above-described resin, which are not particularly limited, include an acrylic resin, a vinyl acetate resin, a vinyl chloride resin, a butadiene resin, a styrene resin, a polyester resin, a crosslinked acrylic resin, a crosslinked styrene resin, a benzoguanamine resin, a phenolic resin, a silicone resin, an epoxy resin, a urethane resin, a paraffin resin, a fluorine resin, and a water-soluble resin, and copolymers in which monomers constituting these resins are combined. Examples of the copolymer, which are not particularly limited, include a styrene-butadiene resin and a styrene-acrylic resin. In addition, as the resin, polymer latex including these resins can be used. As the polymer latex, polymer latex including fine particles of an acrylic resin, a styrene-acrylic resin, a styrene resin, a crosslinked acrylic resin, or a crosslinked styrene resin can be exemplified.

Among these, an acrylic resin, a urethane resin, a polyester resin, and a water-soluble resin, and copolymers in which monomers configuring these resins are combined are preferable, and a copolymer of an acrylic resin is more preferable. These resins tend to be easily used since friction resistance, or a degree of freedom of adjustment of a glass transition temperature or a SP value of the obtained recorded material is high.

The acrylic resin may be a resin polymerized from monomers including at least acrylate or acrylic acid. Acrylic resins polymerized from at least one of acrylate and acrylic acid and another monomer are preferable, and as the another monomer, a styrene acrylic resin using styrene as the another monomer is more preferable.

In addition, examples of the urethane resin, which are not particularly limited, include urethane having a polyether structure, urethane having a polyester structure, urethane having a polycarbonate structure, and urethane having two or more of these structures. In a case where the glass transition temperature required is 0° C. or lower, a urethane resin is preferable since the degree of freedom in design of the resin is high.

Furthermore, examples of the polyether resin, which are not particularly limited, include polyethylene terephthalate.

In addition, examples of the water-soluble resin, which are not particularly limited, include water-soluble polymers such as polyvinyl alcohol, polyvinylpyrrolidone, carboxymethyl cellulose, hydroxyethyl cellulose, and sodium alginate.

Moreover, these resins may be used singly or in combination of two or more kinds thereof.

The glass transition temperature of the resin (hereinafter, also referred to as "Tg") is preferably 30° C. or lower, and more preferably 29° C. or lower. The lower limit, which is not limited, is preferably −70° C. or higher, more preferably −50° C. or higher, even more preferably −30° C. or higher, and particularly preferably 0° C. or higher. When the glass transition temperature of the resin is in the above-described range or lower, the resin layer formed on the recording medium by the treatment liquid A coated easily becomes a uniform thickness, and the resin is easily uniformly dispersed. Thus, there is a tendency that the treatment liquid B can be uniformly laminated on the resin layer, and it is possible to further suppress the generation of unevenness when the treatment liquid B and the ink composition interact with each other. Moreover, Tg can be determined by the methods described in the examples. For example, Tg can be changed by changing at least one of the kind or the composition ratio of monomers used for polymerization of the resin, polymerization conditions, and modification of the resin. Examples of the polymerization conditions include the temperature during the polymerization, the kind of a medium in which monomers are contained, the monomer concentration in the medium, and the kind or the used amount of a polymerization initiator or a catalyst used during the polymerization. The measurement of the glass transition temperature of the resin can be measured by differential scanning calorimetry (DSC method) based on JIS K7121.

The SP value of the resin is preferably 14 or less, more preferably 13 or less, and even more preferably 12 or less. The lower limit, which is not limited, is preferably 8 or greater, more preferably 9 or greater, even more preferably 10 or greater, and particularly preferably 11 or greater. When the SP value of the resin is in the above-described range, even in a case where the treatment liquid A was dried, the resin is less likely to be aggregated, and thus, the resin layer on the recording medium easily becomes a uniform thickness, and the resin is easily uniformly dispersed. Thus, there is a tendency that the treatment liquid B can be uniformly laminated on the resin layer, and it is possible to further suppress the generation of unevenness of a solid pattern when the treatment liquid B and the ink composition interact with each other. In addition, in a case where the SP value of the resin is low, since the SP value of the resin is close to the SP value of the organic solvent included in the treatment liquid B, the treatment liquid B tends to be uniformly coated without unevenness, and thus this is preferable. In addition, when the SP value of the resin is in the above-described range, in general, since the SP value of the resin is close to the SP value of the surface material of the recording medium, the resin of the treatment liquid A tends to be further uniformly spread on the recording medium. Moreover, the SP value can be determined by the methods described in the examples. The SP value can be changed by changing the kind, the composition ratio, or the like of monomers used for polymerization of the resin.

Here, the SP value in the invention will be described. As the SP value, Hansen solubility parameters are used. The Hansen solubility parameter is a parameter which is represented in three-dimensional space after a solubility parameter introduced by Hildebrand is divided into three components of a dispersion term δd, a polarity term δp, and a hydrogen bond term δh, and in the invention, the SP value is represented by δ [(cal/cm³)$^{0.5}$] and a value calculated by using the following formula is used.

$$\delta\ [(cal/cm^3)^{0.5}] = (\delta d^2 + \delta p^2 + \delta h^2)^{0.5}$$

Moreover, much data of the dispersion term δd, the polarity term δp, and the hydrogen bond term δh have been determined by Hansen and his research successors, and the detailed description thereof is disclosed in Polymer Handbook (fourth edition), VII—698 to 711. In addition, Hansen solubility parameter values regarding a large number of solvents and resins have been investigated, and for example, the date is listed in the Industrial Solvents Handbook written by Wesley L. Archer Author.

As the resins having an SP value of 14 or less, which are not limited, for example, particles of polyesters (SP value: around 10), polyvinyl chlorides (SP value: around 9.6), and polyvinylidene chlorides (SP value: around 12.2) are preferable, particles of polyesters and polyvinyl chlorides are more preferable, and particles of polyesters are particularly preferable. These particles can be used as latex, and for example, polyester-based latex, polyvinyl chloride-based latex, and polyvinylidene chloride-based latex can be used. In addition, as commercially available products, which are not particularly limited, examples thereof include Plascoat Z-561 (SP value: 10) [manufactured by Goo Chemical Co., Ltd.], VYLONAL MD-1200 (SP value: 10), VYLONAL MD-1100 (SP value: 10), and VYLONAL MD-1480 (SP value: 10) [hereinbefore, manufactured by Toyobo Co., Ltd.] as a polyester-based latex, and VINYBLAN-900 (SP value: 10.4) and VINYBLAN-609 (SP value: 10.2) [hereinbefore, manufactured by Shin-Etsu Chemical Co., Ltd.) as a vinyl chloride-based latex.

Inorganic Oxide Fine Particles

The inorganic oxide fine particles act as an absorbing layer of the treatment liquid B, and can change the wettability of the treatment liquid B to the recording medium or improve the adhesiveness of the ink composition. Examples of the inorganic oxide fine particles, which are not particularly limited, include silica, alumina, titania, and zirconia. A colloid is preferable as the form of the treatment liquid in view of dispersion stability. Moreover, the inorganic oxide fine particles may be used singly or in combination of two or more kinds thereof.

The content of at least one of the resin and the inorganic oxide fine particles (as a solid content) is preferably 30 parts by mass or less, more preferably 25 parts by mass or less, and even more preferably 23 parts by mass or less with respect to 100 parts by mass of the treatment liquid. The lower limit is preferably 1% by mass or greater, more preferably 5% by mass or greater, even more preferably 10% by mass or greater, and particularly preferably 15% by mass or greater. When the content of at least one of the resin and the inorganic oxide fine particles is in the above-described range, the wettability of the treatment liquid B, the image quality, and the waterproofness of the recorded material tend to be further improved. In view of this, the resin is particularly preferable, and it is possible for the content of the resin to be in the above-described range.

The treatment liquid A may also include other components, if necessary. Examples of the other components, which are not particularly limited, include a solvent, a surfactant, and the like.

Solvent

The solvent is not particularly limited, and for example, an organic solvent or water can be used.

When the treatment liquid A in the embodiment contains water, coating can be easily performed and the image quality is excellent. Examples of the water include pure water such as ion exchange water, ultrafiltration water, reverse osmosis water, or distilled water; and water in which ionic impurities are removed as much as possible such as ultrapure water. In addition, when water sterilized by irradiating with ultraviolet rays or adding hydrogen peroxide is used, it is possible to prevent the generation of fungi or bacteria in a case where the treatment liquid A is preserved for a long period of time. Thus, there is a tendency that storage stability is further improved.

The water content is preferably 10 parts by mass to 95 parts by mass, more preferably 20 parts by mass to 80 parts by mass, and even more preferably 30 parts by mass to 70 parts by mass with respect to 100 parts by mass of the treatment liquid A. When the water content is in the above-described range, there is a tendency that coating is easily performed and the image quality is more excellent.

Examples of the organic solvent, which are not particularly limited, include hydrocarbon-based solvents such as toluene, hexane, cyclohexane, benzene, octane, and isooctane; ester-based solvents such as ethyl acetate, butyl acetate, and γ-butyrolactone; ketone-based solvents such as acetone, methyl ethyl ketone, methyl isobutyl ketone, and cyclohexanone; alcohol-based solvents such as methanol, ethanol, propanol, isopropanol, and butanol; halogen-based solvents such as dichloroethane and chloroform, ether-based solvents such as diethyl ether and tetrahydrofuran; and amide-based solvents such as N,N-dimethylformamide, N,N-dimethylacetamide, N-methyl-2-pyrrolidone, N-ethyl-2-pyrrolidone, N-methyl-ϵ-caprolactam, and hexamethylphosphoramide.

Among these, the treatment liquid A preferably includes a water-soluble organic solvent. When the treatment liquid A including a water-soluble organic solvent is used, the treatment liquid A can be uniformly coated, and thus, the image quality is more excellent. Examples of the water-soluble organic solvent, which are not particularly limited, include polyols and alkanediols. Examples of the polyols, which are not particularly limited, include a polyol having two or three hydroxyl groups with respect to an alkane having 2 or 3 carbon atoms, and a polyol in which a plurality of these are bonded via ether bonds. More specific examples include glycerin, ethylene glycol, diethylene glycol, propylene glycol, and dipropylene glycol. In addition, examples of the alkanediols, which are not particularly limited, include an alkanediols having two hydroxyl groups with respect to an alkane having 4 to 8 carbon atoms. More specific examples include 1,2-hexanediol and 1,2-propanediol.

The boiling point of the organic solvent is preferably 200° C. to 350° C., and more preferably 220° C. to 300° C. When the boiling point of the organic solvent is in the above-described range, there is a tendency that the generation of aggregation unevenness of the ink composition due to slow drying of the ink composition is further suppressed.

The SP value of the organic solvent is preferably 6 to 14, and more preferably 8 to 12. When the SP value of the organic solvent is in the above-described range, the image quality tends to be more excellent.

The content of the organic solvent is preferably 5 parts by mass to 50 parts by mass, more preferably 10 parts by mass to 40 parts by mass, and even more preferably 15 parts by mass to 35 parts by mass with respect to 100 parts by mass of the treatment liquid A. When the content of the organic solvent is in the above-described range, the image quality tends to be more excellent.

Surfactant

Examples of the surfactant, which are not particularly limited, include an acetylene glycol-based surfactant, a silicone-based surfactant, and a fluorine-based surfactant. By including the surfactant, the image quality tends to be more excellent.

Moreover, the treatment liquid A preferably does not include the polyvalent metal salt, the organic acid, and the organic acid salt included in the treatment liquid B described below.

The preferable range of surface tension and viscosity of the treatment liquid A can be the same as the preferable range of surface tension and viscosity of the treatment liquid B described below.

First Drying Step

The recording method according to the embodiment preferably further has a first drying step of drying the treatment liquid A coated on the recording medium between the first coating step and the second coating step. Thus, the image quality tends to be more excellent. Examples of the drying method, which are not particularly limited, include heating, air blowing, and leaving to stand. The surface temperature of the recording medium in the first drying step is preferably 40° C. to 80° C., more preferably 45° C. to 85° C., and even more preferably 50° C. to 70° C. When the surface temperature of the recording medium is in the above-described range, the image quality tends to be more excellent. Moreover, the surface temperature of the recording medium can be obtained by measuring the surface temperature on the recording surface of the recording medium using a noncontact thermometer.

Second Coating Step

The second coating step is a step of coating the treatment liquid B on the recording medium after the first coating step. The coating method is not particularly limited, and for example, a roller coating, a spray coating, and an ink jet coating can be used. Among these, the treatment liquid B is preferably coated on the recording medium by the ink jet method. Thus, ease of adjustment of the coating amount or selectivity for the location to be coated on the recording medium tends to be excellent. In addition, the treatment liquid B is preferably coated on the recording medium by the ink jet method using a line head. Thus, shortening of the recording time tends to be more excellent.

By using the treatment liquid B, it is possible to prevent landing interference or bleeding of the ink composition which is attached to the recording medium after the second coating step, it is possible to draw homogeneous lines and fine images, and thus, the image quality is improved. Here, "to thicken or insolubilize the ink composition" is to increase the viscosity of the ink composition or to insolubilize or aggregate the coloring material included in the ink composition.

In the second coating step, the lower limit of the attaching amount with respect to the recording medium of the total solid content of the coagulant components described below is preferably 0.01 $g/m^2$ or greater, more preferably 0.02 $g/m^2$ or greater, and even more preferably 0.05 $g/m^2$ or greater. The upper limit is preferably 0.5 $g/m^2$ or less, more preferably 0.4 $g/m^2$ or less, even more preferably 0.3 $g/m^2$ or less, still more preferably 0.2 $g/m^2$ or less, and particularly preferably 0.1 $g/m^2$ or less. When the attaching amount is in the above-described range, a recorded material of which the image quality or the waterproofness is more excellent can be obtained. In addition, it is preferable in terms of reduction of the smell and the stickiness caused by the coagulant components of the recorded material.

The above-described attaching amount is a value in the region of the recording medium in which the first coating step described above and the discharging step described below are performed. By performing the first coating step described above, it is possible to achieve the above-described attaching amount in the second coating step, and in particular, even in a case where the upper limit of the attaching amount in the second coating step is a relatively small attaching amount which is the above-described range or less, it is possible to achieve excellent image quality and waterproofness of the recorded material.

In addition, in a case of having a plurality of attaching regions with different attaching amounts in the second coating step, it is preferable that the region with largest attaching amount be taken since the above-described point is more excellent.

Treatment Liquid B

The treatment liquid B includes at least one of a polyvalent metal salt, an organic acid, and an organic acid salt which are components (coagulant components) thickening or insolubilizing the ink composition. Among these, in a case where the treatment liquid B includes the polyvalent metal salt, the image quality tends to be more excellent. By the interaction of the coagulant components with the ink composition, the ink composition is thickened or insolubilized. Thus, it is possible to prevent landing interference and bleeding of the ink composition attached thereafter, and it is possible to draw homogeneous lines and fine images.

Moreover, specific examples of the treatment liquid B which thickens or insolubilizes the ink composition include a treatment liquid which precipitates a coloring material in the ink composition or insolubilizes using an interaction with the ink composition and a treatment liquid which generates a material (gel) in semi-solid form including a coloring material in the ink composition. Then, examples of the method of causing an interaction of the ink composition and the treatment liquid include a method of causing interaction between an anionic coloring material in the ink composition and a cationic compound in the treatment liquid, a method in which the pH of the ink composition is changed by mixing an ink composition and a treatment liquid having different pHs from each other, by this, dispersion breakdown of a pigment in the ink composition is caused, and the pigment is aggregated, and a method in which dispersion breakdown of a pigment in the ink composition is caused by interaction with a polyvalent metal salt contained in the treatment liquid, and the pigment is aggregated.

Polyvalent Metal Salt

Preferable examples of the polyvalent metal salt, which are not particularly limited, include a polyvalent metal salt of an inorganic acid or a polyvalent metal salt of an organic acid. Examples of such a polyvalent metal salt, which are not particularly limited, include salts of alkali earth metals belonging to Group 2 in the periodic table (for example, magnesium and calcium), transition metals belonging to Group 3 in the periodic table (for example, lanthanum), earth metals belonging to Group 13 in the periodic table (for example, aluminum), and lanthanides (for example, neodymium). As these polyvalent metal salts, carboxylate (formate, acetate, and benzoate), sulfate, nitrate, chloride, and thiocyanate are preferable. Among these, a calcium salt or a magnesium salt of carboxylic acid (formic acid, acetic acid, and benzoic acid), a calcium salt or a magnesium salt of sulfuric acid, a calcium salt or a magnesium salt of nitric acid, calcium chloride, magnesium chloride, and a calcium salt or a magnesium salt of thiocyanic acid can be preferably exemplified. Moreover, the polyvalent metal salts may be used singly or in combination of two or more kinds thereof.

Organic Acid

Examples of the organic acid, which are not particularly limited, include phosphoric acid, oxalic acid, malonic acid, citric acid, and acetic acid. Among these, monovalent or bivalent or higher carboxylic acid is preferable. By including such a carboxylic acid, the image quality tends to be more excellent. Moreover, the organic acid may be used singly or in combination of two or more kinds thereof.

Organic Acid Salt

Examples of the organic acid salt, which are not particularly limited, include salts of the organic acids described above (salts other than the polyvalent metal salts described above). Examples of salts of the organic acids described above, which are not particularly limited, include sodium salts such as sodium acetate and the like, potassium salts, and the like. Moreover, the organic acid salts may be used singly or in combination of two or more kinds thereof.

The content of at least any one of the polyvalent metal salt, the organic acid, and the organic acid salt is preferably 1 part by mass to 40 parts by mass, more preferably 5 parts by mass to 30 parts by mass, and even more preferably 7 parts by mass to 25 parts by mass with respect to 100 parts by mass of the treatment liquid B. When the content is in the above-described range, the image quality tends to be more excellent.

The ion concentration of cations of at least any one of the polyvalent metal salt and the organic acid in the treatment liquid B is preferably 0.15 mol/L or less, more preferably 0.10 mol/L or less, and even more preferably 0.08 mol/L or less. In addition, the lower limit of the ion concentration of cations of at least any one of the polyvalent metal salt and the organic acid in the treatment liquid B is preferably 0.001 mol/L or greater, more preferably 0.005 mol/L or greater, and even more preferably 0.01 mol/L or greater. When the concentration is in the above-described range, the image quality and the solubility of the coagulant components tends to be more excellent.

The treatment liquid B may also include other components, if necessary. Examples of the other components, which are not particularly limited, include a surfactant, a solvent, and the like.

Solvent

The solvent is not particularly limited, and for example, an organic solvent or water can be used.

When the treatment liquid B in the embodiment contains water, coating can be easily performed, and safety and the solubility of the coagulant tend to be excellent. Examples of the water include pure water such as ion exchange water, ultrafiltration water, reverse osmosis water, or distilled water; and water in which ionic impurities are removed as much as possible such as ultrapure water. In addition, when water sterilized by irradiating with ultraviolet rays or adding hydrogen peroxide is used, it is possible to prevent the generation of fungi or bacteria in a case where the treatment liquid B is preserved for a long period of time. Thus, there is a tendency that storage stability is further improved.

In addition, when the treatment liquid B in the embodiment contains the organic solvent, there is a tendency that the wettability of the treatment liquid B is improved, the image quality is more excellent, and the discharging stability is more excellent. The content of the organic solvent is preferably 50% by mass or less, more preferably 35% by mass or less, and even more preferably 30% by mass or less. The lower limit, which is not limited, is preferably 0% by mass or greater, more preferably 5% by mass or greater, even more preferably 10% by mass or greater, and particularly preferably 20% by mass or greater. When the content of the organic solvent is in the above-described range, there is a tendency that the wettability of the treatment liquid B is improved, and it is possible to suppress reduction in the solubility of the coagulant.

Examples of the organic solvent, which are not particularly limited, include hydrocarbon-based solvents such as toluene, hexane, cyclohexane, benzene, octane, and isooctane; ester-based solvents such as ethyl acetate, butyl acetate, and γ-butyrolactone; ketone-based solvents such as acetone, methyl ethyl ketone, methyl isobutyl ketone, and cyclohexanone; alcohol-based solvents such as methanol, ethanol, propanol, isopropanol, and butanol; halogen-based solvents such as dichloroethane and chloroform, ether-based solvents such as diethyl ether and tetrahydrofuran; amide-based solvents such as N,N-dimethylformamide, N,N-dimethylacetamide, N-methyl-2-pyrrolidone, N-ethyl-2-pyrrolidone, N-methyl-ϵ-caprolactam, and hexamethylphosphoramide, and water-soluble organic solvents.

Among these, the treatment liquid B preferably includes a water-soluble organic solvent. By using the treatment liquid B including the water-soluble organic solvent, the image quality tends to be more excellent. Examples of the water-soluble organic solvent, which are not particularly limited, include a water-soluble organic solvent which can be included in the treatment liquid A. The preferable range of the SP value of the water-soluble organic solvent which can be used in the treatment liquid B can be the same as the range of the SP value of the water-soluble organic solvent which may included in the treatment liquid A.

In addition, the treatment liquid B can include a surfactant. Examples of the surfactant, which are not particularly limited, include the same surfactant as a surfactant which can be used in the treatment liquid A.

Moreover, the treatment liquid B preferably does not include the resin included in the treatment liquid A or the inorganic oxide fine particles. When the treatment liquid B does not include the resin or the inorganic oxide fine particles, there is a tendency that the effect of improving the image quality that it is possible to suppress reduction in the solubility of the coagulant components in the treatment liquid B, and the effect of image quality improvement derived from the treatment liquid B are easily obtained.

The surface tension of the treatment liquid B is preferably 18 mN/m to 45 mN/m, and more preferably 20 mN/m to 40 mN/m at 25° C. When the surface tension is in the above-described range, the image quality tends to be more excellent. Moreover, the surface tension can be measured by the methods described in the examples.

The viscosity of the treatment liquid B is preferably 1 mPa·s to 10 mPa·s, and more preferably 2 mPa·s to 5 mPa·s at 20° C. When the viscosity is in the above-described range, there is a tendency that coating is easily performed and the image quality is more excellent. Moreover, the viscosity can be measured by the methods described in the examples.

Second Drying Step

The recording method according to the embodiment preferably further has a second drying step of drying the treatment liquid B coated on the recording medium after the second coating step. Thus, the image quality tends to be more excellent. Examples of the drying method, which are not particularly limited, include heating, air blowing, and leaving to stand. The preferable range of the surface temperature of the recording medium in the second drying step can be the same range as the preferable range of the first drying step described above.

Discharging Step

The discharge step is a step of attaching the ink composition to the recording medium by discharging the ink composition including the coloring material from a nozzle after the second coating step. In the discharging step, the ink composition can be attached to the recording medium by discharging the ink composition from a nozzle of a line head or a serial head by the ink jet method. In the line system using the line head, the head is fixed, the recording medium is moved along the sub-scanning direction (vertical direction of the recording medium, transporting direction), and in association with this movement, ink droplets are discharged from the nozzle opening of the head, whereby an image is recorded on the recording medium. In addition, in the serial system using the serial head, the head is moved along the main scanning direction (horizontal direction of the recording medium, width direction), and in association with this movement, ink droplets are discharged from the nozzle opening of the head, whereby an image is recorded on the recording medium.

In the discharging step, the attaching amount (as a composition) of the ink composition is preferably 0.1 g/m$^2$ or greater and 25 g/m$^2$ or less in view of being capable of applying a desired color to the recorded material and being capable of reducing the used amount of the ink composition, while the image quality or the waterproofness of the recorded material is more excellent, and the upper limit is preferably 20 g/m$^2$ or less, more preferably 15 g/m$^2$ or less, and even more preferably 10 g/m$^2$ or less.

The above-described attaching amount is a value in the region of the recording medium in which the first coating step described above and the second coating step are performed.

Ink Composition

Coloring Material

The ink composition of the embodiment may further include a coloring material. As the coloring material, at least one of a pigment and a dye can be used.

Pigment

In the embodiment, by using the pigment as the coloring material, it is possible to improve weather resistance of the ink composition. The pigment can be used without being particularly limited as long as it is generally used in an aqueous pigment ink for ink jet.

Examples of the above-described pigment, which are not particularly limited, include organic pigments such as azo pigments (for example, an azo lake, an insoluble azo pigment, a condensed azo pigment, and a chelate azo pigment are included), polycyclic pigments (for example, a phthalocyanine pigment, a perylene pigment, a perinone pigment, an anthraquinone pigment, a quinacridone pigment, a dioxazine pigment, a thioindigo pigment, an isoindolinone pigment, and a quinophthalone pigment), a nitro pigment, a nitroso pigment, and aniline black; inorganic pigments such as carbon black (for example, furnace black, thermal lamp black, acetylene black, and channel black), metal oxide, metal sulfide, and metal chloride; and extender pigments such as silica, calcium carbonate, and talc.

Specific examples of the above-described pigment, which are not particularly limited, include C.I. Pigment Yellow 64, 74, 93, 109, 110, 128, 138, 139, 150, 151, 154, 155, 180, and 185, C.I. Pigment Red 122, 202, and 209, C.I. Pigment Violet 19, C.I. Pigment Blue 15:3, 15:4, and 60, C.I. Pigment Green 7 (Phthalocyanine Green), 10 (Green Gold), 36, and 37, C.I. Pigment Brown 3, 5, 25, and 26, and C.I. Pigment Orange 1, 2, 5, 7, 13, 14, 15, 16, 34, 36, 38, 64, and 71.

The above-described pigment is preferably added to the ink composition as a pigment dispersion obtained by dispersal in water by a dispersant, or as a pigment dispersion obtained by dispersing a self-dispersing type surface-treated pigment in which a hydrophilic group has been introduced on the pigment particle surfaces using a chemical reaction, in water or obtained by adding a pigment to the ink composition.

Specific examples of the above-described dispersant, which are not particularly limited, include polymer dispersants (proteins such as glue, gelatin, casein, and albumin, natural rubbers such as gum arabic and gum tragacanth, glucosides such as saponin, alginic acid ferment methyl cellulose such as alginic acid and propylene glycol ester, triethanolamine alginate, and ammonium alginate cellulose derivatives such as carboxymethyl cellulose and hydroxyethyl cellulose, acryl-based resins such as polyvinyl alcohols, polypyrrolidones, polyacrylic acid, an acrylic acid-acrylonitrile copolymer, a potassium acrylate-acrylonitrile copolymer, a vinyl acetate-acrylic acid ester copolymer, and an acrylic acid-acrylic acid ester copolymer, styrene-acrylic resins such as a styrene-acrylic acid copolymer, a styrene-methacrylic acid copolymer, a styrene-methacrylic acid-acrylic acid ester copolymer, and a styrene-m-methyl styrene-acrylic acid copolymer, vinyl acetate-based copolymers such as a styrene-maleic acid copolymer, a styrene-maleic anhydride copolymer, a vinyl naphthalene-acrylic acid copolymer, a vinyl acetate-ethylene copolymer, a vinyl acetate-fatty acid vinyl ethylene copolymer, a vinyl acetate-maleic acid ester copolymer, a vinyl acetate-crotonic copolymer, and a vinyl acetate-acrylic acid copolymer, and salts thereof) and surfactants (various kinds of anionic surfactants, nonionic surfactants, and amphoteric surfactants).

The above-described self-dispersing type surface-treated pigment in which a hydrophilic group has been introduced is a pigment which can be dispersed or dissolved in water without a dispersant by a surface treatment by which carboxyl groups and salts thereof are directly bonded to the surface of the pigment. Specifically, it is possible to obtain the above-described surface-treated pigment by grafting functional groups or molecules including functional groups to the surface of the pigment by a physical treatment by vacuum plasma or a chemical treatment using sodium hypochlorite or an oxidant such as ozone. The functional groups which are grafted to one pigment particle may be a single kind or a plurality of kinds. The kind and degree of the functional groups which are grafted may be appropriately determined in consideration of the dispersion stability in the ink, the color density, and the drying properties of the ink jet head front surface.

In addition, the above-described pigment coated with a polymer, which is not particularly limited, can be obtained, for example, by performing emulsion polymerization in water using monomers (copolymerizable monomers) which can be polymerized with a dispersant and a photo-radical polymerization initiator after dispersing the pigment using the dispersant having a polymerizable group. Among the polymers, a polymer obtained by polymerizing monomers or oligomers having at least one of an acryloyl group, a methacryloyl group, a vinyl group, and an allyl group as a double bond according to a known polymerization method using the photo-radical polymerization initiator can be appropriately used. The emulsion polymerization described above can be performed using a general method, and the polymerization proceeds due to free radicals generated by thermal decomposition of the water soluble photo-radical polymerization initiator in the presence of an emulsifier.

The pigment and the dispersant constituting the above-described pigment dispersion may be used alone respectively, or two or more kinds may be used in combination.

The coloring material is used to obtain an advantageous effect of a sharp image formation on media of various colors, and is preferably 0.05% by mass to 25% by mass, more preferably 0.1% by mass to 20% by mass, even more preferably 0.3% by mass to 15% by mass, and particularly preferably 0.5% by mass to 10% by mass is contained with respect to the total amount of the ink composition (100% by mass) in terms of a solid content.

Resin Emulsion

The ink composition used in the embodiment preferably further includes a resin emulsion. By using the resin emulsion, it is possible to make the friction resistance and the washing fastness of the image portion of the recorded material be more excellent since when the ink composition is dried, resins, and a resin and a pigment are fused together, respectively, and the pigment is fixed on the recording medium. Among the resin emulsions, a urethane resin emulsion and an acrylic resin emulsion are preferable, and a urethane resin emulsion is more preferable. Thus, since the fixing property of the ink composition becomes excellent, both the friction resistance and the waterproofness of the recorded material become excellent. A resin emulsion which may be included in the treatment liquid A described above can be used.

In the case where the resin emulsion is included in the ink composition, the resin emulsion sufficiently fixes the ink composition on the recording medium by forming a resin film on the recording medium and thus, the friction resistance of the recorded material becomes excellent. For this reason, the resin emulsion is preferably a thermoplastic resin. In particular, desired physical properties of the film are easily obtained since a urethane resin emulsion has a high flexibility of design.

The resin content of the resin emulsion is preferably 1% by mass to 20% by mass, more preferably 1% by mass to 15% by mass, even more preferably 1% by mass to 10% by mass, and particularly preferably 1% by mass to 5% by mass with respect to the total mass (100% by mass) of the ink composition. When the content is in the above-described range, the waterproofness and the friction resistances of the recorded material tend to become excellent, the long-term storage stability of the ink composition is excellent, and particularly, there is a tendency that the viscosity of the ink composition can be lowered.

Solvent

The ink composition in the embodiment preferably further includes a solvent. Among organic solvents, a volatile water-soluble organic solvent is more preferable. Specific examples of the organic solvent, which are not particularly limited, include alcohols or glycols such as glycerin, ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, methanol, ethanol, n-propyl alcohol, iso-propyl alcohol, n-butanol, 2-butanol, tert-butanol, iso-butanol, n-pentanol, 2-pentanol, 3-pentanol, and tert-pentanol, N,N-dimethylformamide, N,N-dimethylacetamide, 2-pyrrolidone, N-methyl-2-pyrrolidone, 2-oxazolidone, 1,3-dimethyl-2-imidazolidinone, dimethyl sulfoxide, sulfolane, and 1,1,3,3-tetramethyl urea.

The organic solvents may be used alone or two or more kinds may be used in combination. The content of the organic solvent, which is not particularly limited, may be appropriately determined as necessary. For example, in a case of making permeability of the ink composition into the recording medium be excellent, one or more kinds selected from the group consisting of 1,2-hexanediol, triethylene glycol monobutyl ether, and dipropylene glycol monopropyl ether are preferably used.

The content of the organic solvent is preferably 3% by mass to 50% by mass, more preferably 5% by mass to 30% by mass, and even more preferably 7% by mass to 25% by mass with respect to the total mass (100% by mass) of the ink composition. When the content of the organic solvent is in the above-described range, the image quality and the discharging stability tend to be excellent.

Surfactant

The ink composition used in the embodiment preferably includes a surfactant. As the surfactants, which are not particularly limited, for example, at least one of an acetylene glycol-based surfactant, and a polysiloxane-based surfactant is preferable. When the ink composition includes these surfactants, the drying properties of the ink composition attached to a recording medium become more excellent, and high-speed printing becomes possible.

Among these, the polysiloxane-based surfactant is more preferable since the solubility in the ink composition is increased and foreign matter in the ink composition is less likely to be generated.

As the above acetylene glycol-based surfactant, which are not particularly limited, for example, one or more kinds selected from 2,4,7,9-tetramethyl-5-decyne-4,7-diol and alkylene oxide adducts of 2,4,7,9-tetramethyl-5-decyne-4,7-diol, and 2,4-dimethyl-5-decyne-4-ol and alkylene oxide adducts of 2,4-dimethyl-5-decyne-4-ol are preferable. These are available as commercially available products such as OLFINE (registered trademark) 104 series and E series (product name, manufactured by Air Products Japan, Inc.) such as OLFINE E1010, OLFINE PD-002W, Surfynol (registered trademark) 465 and Surfynol 61 (product name, manufactured by Nissin Chemical Industry Co., Ltd.).

In addition, examples of the polysiloxane-based surfactant, which are not particularly limited, include BYK-347 and BYK-348 (product names, manufactured by BYK Japan KK).

The content of the surfactant described above is preferably 0.1% by mass to 3% by mass, more preferably 0.2% by mass to 1% by mass, and even more preferably 0.3% by mass to 0.7% by mass with respect to the total mass (100% by mass) of the ink composition. When the content is in the above-described range, the image quality and the discharging stability tend to be more excellent.

Cyclic Amide Compound

The ink composition used in the embodiment preferably further includes a cyclic amide compound. Since when the ink composition includes the cyclic amide compound, the solubility of a urethane resin (emulsion) is further strengthened and the precipitation of foreign materials in the ink composition can be more effectively prevented, the storage stability, particularly, the storage stability at high temperature becomes more excellent.

In addition, since the cyclic amide compound also has a moisture retaining property, the cyclic amide compound can prevent aggregation and solidification caused by evaporation of the water in a resin (polymer) other than the urethane resin (emulsion), and the pigment during the storage of the ink composition. Thus, clogging near the nozzle of a head during ink jet recording can be prevented, and the discharging stability of the ink composition tends to become more excellent.

Examples of the cyclic amide compound, which are not particularly limited, include 2-pyrrolidone, N-methyl-2-pyrrolidone, and N-ethyl-2-pyrrolidone. Among them, 2-pyrrolidone is preferable since the dissolving power with respect to the resin (polymer) is further more strengthened and the storage stability, particularly, the storage stability at high temperature becomes even more excellent.

The cyclic amide compound may be used alone or two or more kinds may be used in combination.

The content of the cyclic amide compound is preferably 0.5% by mass to 5% by mass, and more preferably 1% by mass to 3% by mass with respect to the total mass (100% by mass) of the ink composition. When the content is in the above-described range, the long-term storage stability and the discharging stability of the ink composition, the friction resistance and the washing fastness of the recorded material caused by the excellent fixing property of the ink composition become more excellent.

Moreover, to avoid duplication, it is considered that various additives (components) which will be described below do not include the cyclic amide compound described above.

Moisturizing Agent

The ink composition used in the embodiment preferably further includes a moisturizing agent (wetting agent). The moisturizing agent can be used without being particularly limited as long as it is generally used in ink jet ink. The boiling point of the moisturizing agent is preferably 180° C. or higher, and more preferably 200° C. or higher. When the boiling point is within the above-described range, it is possible to provide an excellent water holding property and wetting property to the ink composition.

Specific examples of the moisturizing agent having a high boiling point, which are not particularly limited, include ethylene glycol, propylene glycol, diethylene glycol, triethylene glycol, pentamethylene glycol, trimethylene glycol, 2-butene-1,4-diol, 2-ethyl-1,3-hexanediol, 2-methyl-2,4-pentanediol, tripropylene glycol, polyethylene glycol having a number average molecular weight of 2,000 or less, 1,3-propylene glycol, isopropylene glycol, isobutylene glycol, glycerin, meso-erythritol, and pentaerythritol.

The moisturizing agent may be used alone or two or more kinds may be used in combination. When the ink composition includes the moisturizing agent having a high boiling point, it is possible to obtain an ink composition which can maintain fluidity and redispersibility for a long period of time even if the ink composition is left in a state where the pigment ink is exposed to air in an open state. Furthermore, in such an ink composition, since the clogging of nozzles is less likely to occur while recording is performed using the recording apparatus or at the time of being restarted after an interruption, the discharging stability of the ink composition becomes excellent.

The content of the moisturizing agent is preferably 1% by mass to 30% by mass, more preferably 5% by mass to 20% by mass, and even more preferably 7% by mass to 15% by mass with respect to the total mass (100% by mass) of the ink composition. When the content of the moisturizing agent is in the above-described range, the discharging stability tends to be excellent.

Moreover, as described above, in the case where the ink composition includes the cyclic amide compound, since the cyclic amide compound has a moisture retaining property, the cyclic amide compound is preferably used as the moisturizing agent.

Other Components

In the ink composition used in the embodiment, various additives such as a solubilizer, a viscosity modifier, moisturizing agent, a pH adjusting agent, an antioxidant, a preservative, an antifungal agent, a corrosion inhibitor and a chelating agent for capturing metal ions which affect dispersion can be appropriately added in order to maintain the storage stability thereof and excellent discharging stability from the head, to improve anti-clogging or to prevent deterioration of the ink composition. The ink composition used in the embodiment is preferably an aqueous ink composition which most largely includes water among the volatile components from the viewpoint of safety.

Recording Medium

The recording method according to the embodiment can be widely applied to recording media having various absorbing performances from a non-absorbent recording medium into which the ink composition is less likely to penetrate to an absorbent recording medium into which the ink composition is likely to penetrate. Examples of the recording medium used in the recording method according to the embodiment, which are not particularly limited, include an absorbent recording medium, a low-absorbent recording medium, and a non-absorbent recording medium. Among these, a low-absorbent recording medium, and a non-absorbent recording medium are preferable and a non-absorbent recording medium is more preferable. Since in a low-absorbent recording medium and a non-absorbent recording medium, the waterproofness and the friction resistance are excellent, cissing of the treatment liquid B is likely to occur, and the adhesiveness of the ink composition tends to be low, in particular, the recording method according to the embodiment is useful, and in a case of a non-absorbent recording medium among these, the recording method according to the embodiment is useful.

Here, "low absorbent recording medium" and "non-absorbent recording medium" refer to a recording medium of which the water absorption amount from the start of contact until 30 milliseconds is equal to or less than $10 \, mL/m^2$ according to the Bristow method. The Bristow method is the most widely used method as a method of measuring the liquid absorption amount in a short time, and is also employed by the Japan Technical Association of the Pulp and Paper Industry (JAPAN TAPPI). The details of the testing method are disclosed in the standard No. 51 "Paper and Cardboard-Liquid Absorbency Test Method—Bristow Method" of the "JAPAN TAPPI Paper and Pulp Test Method 2000 Edition".

In addition, the non-absorbent or the low absorbent recording medium can be classified according to the wettability with respect to water on the recording surface. In addition, a 0.5 μL water droplet is dropped on the recording surface of the recording medium, the reduction rate of the contact angle (comparison between the contact angle at 0.5 milliseconds after landing and the contact angle at 5 seconds after landing) is measured, and by this the recording medium can be characterized. More specifically, for the properties of the recording medium, non-absorbent refers to the above-described reduction rate being less than 1%, low absorbent refers to the above-described reduction rate being 1% or greater and less than 5%, and absorbent refers to the above-described reduction rate being 5% or greater. Moreover, the contact angle can be measured using a portable contact angle meter PCA-1 (manufactured by Kyowa Kaimen Kagaku), or the like.

Examples of the absorbent recording medium, which are not particularly limited, include plain paper such as electrophotographic paper in which penetrability of the ink composition is high, ink jet printing paper (paper used exclusively for an ink jet provided with an ink absorbing layer composed of silica particles or alumina particles, or an ink absorbing layer formed of a hydrophilic polymer such as polyvinyl alcohol (PVA) or polyvinyl pyrrolidone (PVP)), art paper, coated paper, and cast paper used in general offset printing in which penetrability of the ink composition is relatively low.

Examples of the low absorbent recording medium, which are not particularly limited, include coated paper provided with a coating layer for receiving oil-based inks on the surface. Examples of the coated paper, which are not particularly limited, include actual printing paper such as art paper, coated paper, and matte paper.

Examples of a non-absorbent recording medium, which are not particularly limited, include plastic films not having an ink absorbing layer, and base materials such as paper coated with a plastic, or to which a plastic film is attached. Examples of the plastic described here include polyvinyl chloride, polyethylene terephthalate, polycarbonate, polystyrene, polyurethane, polyethylene, and polypropylene.

Furthermore, in addition to the above-described recording media, an ink non-absorbent recording medium or an ink low absorbent recording medium such as a metal plate of iron, silver, copper, or aluminum, or glass can be used.

The SP value of the surface material of the recording medium is preferably 6 to 14, more preferably 6 to 12, and even more preferably 8 to 10. When the SP value is in the above-described range, the image quality tends to be more excellent. Examples of the surface material of the recording medium having such a SP value, which are not particularly limited, include PET, polyvinyl chloride, and polypropylene. Moreover, the SP value can be measured by the methods described in the examples.

EXAMPLES

Hereinafter, the invention will be more specifically described using Examples and Comparative Examples. The invention is not limited to these Examples.
Material
The main materials used in the following Examples and Comparative Examples are as follows.
Ink Composition
  Coloring Material
Pigment Blue 15:3
Dispersant (dispersion resin)
Acrylic acid-acrylic acid ester copolymer (weight average molecular weight: 25,000, Tg: 80° C., and acid value: 180)
Resin Emulsion
Styrene-acrylic acid copolymer (weight average molecular weight: 50,000, acid value: 130, and average particle diameter: 75 nm)
Solvent
1,2-hexanediol
Surfactant
BYK-348 (polyether-modified organosiloxane, manufactured by BYK Japan KK), OLFINE PD-002W (acetylene glycol-based surfactant, HLB: 9 to 10, manufactured by Nissin Chemical Industry Co., Ltd.)
Cyclic Amide Compound
2-Pyrrolidone
Moisturizing Agent
Propylene glycol
Preparation of Ink Composition Each material was mixed according to the composition (% by mass) shown below in Table 1, and the mixture was sufficiently stirred, thereby obtaining each ink composition.

TABLE 1

|  | Ink |
| --- | --- |
| Pigment Blue 15:3 | 4 |
| Acrylic acid-acrylic acid ester copolymer (dispersant) | 2 |
| Styrene-acrylic acid copolymer (resin emulsion) | 2 |
| 1,2-Hexanediol | 5 |
| BYK-348 | 0.6 |
| OLFINE PD-002W | 0.2 |
| 2-Pyrrolidone | 5 |
| Propylene glycol | 10 |
| Ion exchange water | Balance |
| Total | 100 |

Treatment Liquid
Resin
  EM1 (urethane resin emulsion, product name: RESAMINE D-1060, manufactured by Dainichiseika Color & Chemicals Mfg. Co., Ltd., Tg: −70° C., and SP value: 9)
  EM2 (polyester resin emulsion, product name: Elitel KT8701, manufactured by Unitika Ltd., Tg: 13° C., and SP value: 10)
  EM3 (styrene-acrylic resin emulsion, Tg: 29° C., and SP value: 13)
  EM4 (styrene-acrylic resin emulsion, Tg: 80° C., and SP value: 15)
  EM5 (polyester resin emulsion, Tg: 13° C., and SP value: 15)
  EM6 (styrene-acrylic resin emulsion, Tg: 80° C., and SP value: 10)
  Water-soluble resin (polyvinyl alcohol, product name: Gohsenol, manufactured by Nippon Synthetic Chemical Industry Co., Ltd., and Tg: 85° C.)
Inorganic Oxide Fine Particles
  Colloidal silica (product name: Snowtex ST30, manufactured by Nissan Chemical Industries, Ltd.)
Polyvalent Metal Salt
  Magnesium sulfate heptahydrate
Organic Acid
  Malonic acid
Organic Acid Salt
  Calcium nitrate tetrahydrate
Surfactant
  OLFINE E1010 (acetylene glycol-based surfactant, manufactured by Nissin Chemical Industry Co., Ltd.)
Organic Solvent
  1,2-Hexanediol (SP value: around 13) Propylene glycol (SP value: around 13)
Preparation of Treatment Liquids A and B Each material was mixed according to the composition ratio (% by mass) shown below in Tables 2 and 3, and the mixture was sufficiently stirred, thereby obtaining the treatment liquids A and B.
Measurement Method of Glass Transition Temperature (Tg)

Tg's of the treatment liquid A and the resin used in the ink composition were measured using a DSC7020 manufactured by Hitachi High-Tech Science Corporation by differential scanning calorimetry (DSC).

Measurement Method of SP Value

The SP values of the resin used in the treatment liquid A and the organic solvent used in the treatment liquids A and B were calculated based on Hansen solubility parameters.

Measurement Method of Surface Tension of Treatment Liquids A and B

The surface tensions of the treatment liquids A and B were measured at 25° C. using a surface tensiometer (surface tensiometer CBVP-Z manufactured by Kyowa Interface Science Co., Ltd.) by the Wilhelmy method.

Measurement Method of Viscosity of Treatment Liquids A and B

The viscosities of the treatment liquids A and B were measured using a viscometer (product name: MCR-300, manufactured by Physica) at 25° C. The rotation speed was set to 100 rpm using a cone (diameter: 75 mm, angle: 1°).

Solubility of Coagulant Component of Treatment Liquid B

The prepared treatment liquid B was stored in an undisturbed state at room temperature for 7 days. After storing, the dissolved state of the treatment liquid B was visually observed. On the basis of the observation result, the solubility of the coagulant component in the treatment liquid B was evaluated according to the following evaluation criteria. Moreover, immediately after the preparation, sedimentation of the coagulant component was not observed in any treatment liquid B.

B: Sedimentation of the coagulant component was not observed.
C: Sedimentation of the coagulant component was observed.

From comparison of a treatment liquid B4 with other treatment liquids B, it was found that as the organic solvent is smaller, the solubility of the polyvalent metal salt is high. Moreover, the treatment liquid B4 could be used without any problem as long as it was used immediately after preparation.

Intermittent Discharging Stability of Treatment Liquid B

The intermittent discharging stability of the treatment liquid B in a case of performing a recording method described below was evaluated using a remodeled SUREPRESS L-4033A (manufactured by Seiko Epson Corporation) described below. Specifically, the treatment liquid B was filled into the head, a cycle in which discharge was continuously performed for 5 minutes and discharge was stopped for 1 minute (during stoppage, the head was left to stand without being capped) was set to one set, and the set was repeated five times. Then, the number of the non-discharge nozzles among the 360 nozzles was counted. On the basis of the number of non-discharge nozzles, the intermittent discharging stability was evaluated according to the following evaluation criteria.
A: 5 or less
B: 6 or greater From comparison of the treatment liquids B1 and B2 with other treatment liquids B, it was found that the treatment liquid including the organic solvent had excellent intermittent discharging stability.

TABLE 2

| | | Treatment liquid A | | | | | | | | |
|---|---|---|---|---|---|---|---|---|---|---|
| | | A1 | A2 | A3 | A4 | A5 | A6 | A7 | A8 | A9 |
| Resin | EM1 (Tg: −70° C., SP value: 9) | 20 | — | — | — | — | — | — | — | — |
| | EM1 (Tg: 13° C., SP value: 10) | — | 20 | — | — | — | 5 | — | — | — |
| | EM1 (Tg: 29° C., SP value: 13) | — | — | 20 | — | — | — | 20 | — | — |
| | EM1 (Tg: 80° C., SP value: 15) | — | — | — | 20 | — | — | — | — | — |
| | EM1 (Tg: 13° C., SP value: 10) | — | — | — | — | — | — | — | 20 | — |
| | EM1 (Tg: 80° C., SP value: 10) | — | — | — | — | — | — | — | — | 20 |
| | Water-soluble resin (Tg 85° C.) | — | — | — | — | 20 | — | — | — | — |
| Inorganic oxide fine particles | Colloidal silica | — | — | — | — | — | 20 | — | — | — |
| Surfactant | OLFINE E1010 | 0.3 | 0.3 | 0.3 | 0.3 | 0.3 | 0.3 | 0.3 | 0.3 | 0.3 |
| Organic solvent | 1,2-Hexanediol | 10 | 10 | 10 | 10 | 10 | 10 | 10 | 10 | 10 |
| | Propylene glycol | 20 | 20 | 20 | 20 | 20 | 20 | Balance | 20 | 20 |
| Ion exchange water | | Balance | Balance | Balance | Balance | Balance | Balance | — | Balance | Balance |
| Total | | 100 | 100 | 100 | 100 | 100 | 100 | 100 | 100 | 100 |

TABLE 3

| | | Treatment liquid B | | | | |
|---|---|---|---|---|---|---|
| | | B1 | B2 | B3 | B4 | B5 |
| Polyvalent metal salt | Magnesium sulfate heptahydrate | 5 | 20 | 5 | 5 | — |
| Organic acid | Malonic acid | — | — | — | — | 5 |
| Surfactant | OLFINE E1010 | 0.01 | 0.01 | 0.5 | 2 | 0.5 |
| Organic solvent | 1,2-Hexanediol | — | — | 10 | 20 | 10 |
| | Propylene glycol | — | — | 20 | 20 | 20 |
| Ion exchange water | | Balance | Balance | Balance | Balance | Balance |
| Total | | 100 | 100 | 100 | 100 | 100 |
| Ion concentration of cations [mol/L] | | 0.02 | 0.08 | 0.02 | 0.02 | — |
| pKa of reaction agent | | −3 | −3 | −3 | −3 | 2.855 |

TABLE 3-continued

|  | Treatment liquid B | | | | |
| --- | --- | --- | --- | --- | --- |
|  | B1 | B2 | B3 | B4 | B5 |
| Viscosity [mPa · s] | 1 | 2 | 4 | 7 | 10 |
| Surface tension [mN/m] | 45 | 45 | 20 | 18 | 20 |
| Solubility of coagulant component | B | B | B | D | B |
| Intermittent discharging stability | B | B | A | A | A |

Ink Jet Recording Apparatus

The remodeled SUREPRESS L-4033A (manufactured by Seiko Epson Corporation) was used (hereinafter, referred to as "remodeled L-4033A"). The remodeled portions were as follows.

As shown in FIGURE, a plurality of line heads for discharging each treatment liquid and ink composition in the recording medium transporting direction on the platen were disposed. Specifically, the heads which discharge each treatment liquid and ink composition were disposed such that each gap between the heads in the transporting direction was 50 cm. Moreover, a nozzle pitch in the width direction of the recording medium of each head was set to 360 dpi. In addition, the platen heater and the preheater were adjusted such that the temperature of the recording surface of the recording medium facing the head on the platen becomes 60° C. Furthermore, the line heads were fixed on the platen, and a line printer capable of recording while transporting a roll paper onto the platen with respect to the fixed line heads was obtained.

Recording Method (Examples 1 to 20 and Comparative Examples 1 to 4)

From upstream to downstream in the transporting direction, the treatment liquid A, the treatment liquid B, and the ink composition were discharged from the line heads in one pass in this order, and a pattern of each treatment liquid and ink composition was overlappingly recorded. The recording resolution of the pattern of each of the treatment liquid A, the treatment liquid B, and the ink composition was 360×360 dpi, and the size of the pattern was 5 cm×5 cm as a solid pattern. In addition, a ruled line pattern formed of one row of ink droplets which were arranged at 360 dpi was recorded. Moreover, the coating amount of the treatment liquids A and B, and the recording speed of the recording medium were as described in Table 4, and the coating amount of the ink composition was 0.1 g/m². The coating amount of the treatment liquid A is a value in terms of the total solid content of at least one of the resin and the inorganic oxide fine particles included in the treatment liquid. The coating amount of the treatment liquid B is the liquid amount of the treatment liquid B. In addition, as the recording medium, Lumirror E20 (PET, manufactured by Toray Industries, Inc., and the SP value of the surface material of the recording medium: 10.7) or NP Coat paper (manufactured by Lintec Corporation) were used.

Moreover, the SP value of the material of the recording medium surface was measured in the same manner as "Measurement Method of SP Value" described above.

Wettability of Treatment Liquid B

In the above-described recording method, the state of the surface of the recording medium before discharging the ink composition after coating the treatment liquid B was visually observed. On the basis of the observation result, the wettability of the treatment liquid B was evaluated according to the following evaluation criteria.

A: Cissing of the treatment liquid B was not observed.
B: Cissing of the treatment liquid B was slightly observed.
D: Cissing of the treatment liquid B was significantly observed.

Image Quality

The solid pattern and the ruled line patterns for the recorded materials obtained by the above-described recording method were visually observed. On the basis of the observation results, the image quality was evaluated according to the following evaluation criteria.

A: Aggregation unevenness in which color is non-uniform in the solid pattern, or the ruled line balls as balls are connected in the ruled line pattern was not seen.
B: Aggregation unevenness in the solid pattern was slightly seen, or ruled line balls in the ruled line pattern were slightly seen.
D: Aggregation unevenness in the solid pattern was significantly seen, or the ruled line balls in the ruled line pattern were significantly seen.

Waterproofness of Recorded Material

The recorded material obtained by the above-described recording method was immersed in water (room temperature) for 1 hour, and after taking out the recorded material from the water, the surface of the solid pattern was rubbed 50 times with a load of 1 kg using a cloth. Then, the state of the surface of the recording medium was visually observed. On the basis of the observation result, the waterproofness (adhesiveness after immersing in water) was evaluated according to the following evaluation criteria.

B: There was no change on the surface of the solid pattern.
C: Peeling or defects were slightly generated on the surface of the solid pattern.
D: There was peeling on the majority of the surface of the solid pattern.

TABLE 4

|  | Example | | | | | | | | | | | |
| --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 |
| Treatment liquid A | A1 | A2 | A3 | A4 | A5 | A6 | A7 | A8 | A9 | A3 | A3 | A3 |
| Treatment liquid A coating amount [g/m²] | 0.8 | 0.8 | 0.8 | 0.8 | 0.8 | 0.8 | 0.8 | 0.8 | 0.8 | 0.8 | 0.8 | 0.8 |

TABLE 4-continued

|  | | | | | | | | | | | | |
|---|---|---|---|---|---|---|---|---|---|---|---|---|
| Treatment liquid B | B3 | B3 | B3 | B3 | B3 | B3 | B3 | B3 | B3 | B1 | B2 | B4 |
| Treatment liquid B coating amount [g/m²] | 4 | 4 | 4 | 4 | 4 | 4 | 4 | 4 | 4 | 4 | 4 | 4 |
| Recording speed [m/min] | 10 | 10 | 10 | 10 | 10 | 10 | 10 | 10 | 10 | 10 | 10 | 10 |
| Recording medium | PET | PET | PET | PET | PET | PET | PET | PET | PET | PET | PET | PET |
| Wettability of treatment liquid B | A | A | A | A | A | A | A | A | A | A | A | A |
| Image quality (unevenness in solid printing · ruled line ball) | A | A | A | B | B | A | B | A | A | B | A | B |
| Waterproofness of recorded medium | B | B | B | B | D | B | B | B | B | B | B | B |

|  | Example | | | | | | | | Comparative Example | | | |
|---|---|---|---|---|---|---|---|---|---|---|---|---|
|  | 13 | 14 | 15 | 16 | 17 | 18 | 19 | 20 | 1 | 2 | 3 | 4 |
| Treatment liquid A | A3 | A2 | A3 | A3 | A4 | A8 | A9 | A3 | — | — | — | — |
| Treatment liquid A coating amount [g/m²] | 0.8 | 0.02 | 0.8 | 0.8 | 0.8 | 0.8 | 0.8 | 0.8 | — | — | — | — |
| Treatment liquid B | B5 | B3 | B3 | B5 | B3 | B3 | B3 | B5 | B1 | B2 | B3 | B5 |
| Treatment liquid B coating amount [g/m²] | 4 | 4 | 4 | 4 | 4 | 4 | 4 | 4 | 4 | 4 | 4 | 4 |
| Recording speed [m/min] | 10 | 10 | 20 | 20 | 20 | 20 | 20 | 20 | 10 | 10 | 10 | 10 |
| Recording medium | PET | PET | PET | PET | PET | PET | PET | NP-Coat | PET | PET | PET | PET |
| Wettability of treatment liquid B | A | A | A | A | A | A | A | A | D | D | B | B |
| Image quality (unevenness in solid printing · ruled line ball) | A | B | A | B | B | B | B | A | D | D | D | D |
| Waterproofness of recorded medium | B | B | B | B | B | B | B | C | C | C | C | B |

Each of Examples 1 to 6, 8, and 9 had a different kind or content of resin included in the treatment liquid A. From comparison of Example 4 with other Examples, it was found that when Tg of the resin used in the treatment liquid A is 80° C. or lower and the Sp value is 15 or less, the image quality was improved. In addition, from comparison of Example 4 with Example 9, it was found that as the Sp value of the resin is lower, the image quality is improved. In addition, from comparison of Example 4 with Example 8, it was found that as Tg of the resin is lower, the image quality is improved. In addition, from comparison of Example 5 with other Examples, it was found that in a case where the resin dispersion was used as the resin, the waterproofness of the recorded material was excellent.

From comparison of Example 7 with Example 3, it was found that the image quality in a case where the treatment liquid includes water as the solvent was further improved than that in a case where the treatment liquid A includes not water but a large amount of organic solvent having a high boiling point. Moreover, it was found that in Example 7, drying of the treatment liquid A tended to be slow.

From comparison of Example 11 with Example 10, it was found that as the amount of the coagulant component is larger, the image quality is excellent. From comparison of Example 10 with Example 3, it was found that in a case where the treatment liquid B includes the organic solvent, the image quality is excellent, and the discharging stability is also excellent, and from Example 12, it was found that in a case where the content of the organic solvent is a predetermined amount or less, the solubility of the coagulant component is excellent.

From comparison of Example 14 with Example 2, it was found that as the coating amount of the treatment liquid A was larger, the image quality was improved.

When the transportation speed is high, productivity of the recorded material becomes high, and thus it is preferable, however, since the film formation by heating the resin included in the treatment liquid B was insufficient, and the image quality tended to be reduced, in a case where the transportation speed is high, the embodiment is particularly useful.

From comparison of Example 20 with Example 16, it was found that in a case where PET was used as the recording medium, the waterproofness of the recorded material was excellent and the image quality was poor compared to a case where the NP Coat paper was used. In addition, although not described in the table, when an evaluation was performed in the same manner as in Comparative Example 1 except for using the NP Coat as the recording medium, the wettability of the treatment liquid B was B, and the image quality and the waterproofness of the recorded material were the same as in Comparative Example 1. Therefore, in a case where the non-absorbing recording medium was used, it was possible to produce a recorded material having excellent waterproofness, however, since there is a tendency that the wettability of the treatment liquid B is likely to be poor and the image quality is likely to be reduced, it is particularly useful to use the embodiment.

Moreover, although being not described in the table, when an evaluation was performed in the same manner as in Example 1 except for performing the coating of the ink composition without coating the treatment liquid B after the coating of the treatment liquid A, the image quality was D, the waterproofness of the recorded material was B, and although the waterproofness of the recorded material was excellent, the image quality was poor. In addition, when an evaluation was performed in the same manner as in Comparative Example 1 except for using the treatment liquid A made to be the total of 100 by adjusting the amount of ion exchange water which does not include the resin in the treatment liquid A, as the treatment liquid A, the result was the same as in Comparative Example 1, and in a case where the treatment liquid A which does not include the resin was used, the result was the same as in a case where the treatment liquid A was not used. In this respect, the result in a case where the treatment liquid B which does not include the coagulant was used was also the same as in a case where the treatment liquid B was not used.

In addition, in Examples, it was found that in the example in which the coating amount of the treatment liquid A was small, drying of the treatment liquid A tended to be fast while the wettability of the treatment liquid B, the image quality of the recorded material, and the waterproofness were sufficient, and thus it was more preferable. Furthermore, in Examples, it was found that in the example in which the coating amount of the treatment liquid B was small, the smell and the stickiness caused by the coagulant components of the treatment liquid B tended not to occur while the image quality of the recorded material and the waterproofness were sufficient, and thus it was more preferable.

The entire disclosure of Japanese Patent Application No. 2013-207077, filed Oct. 2, 2013 and 2014-124056, filed Jun. 17, 2014 are expressly incorporated by reference herein.

What is claimed is:

1. A recording method comprising:
    first coating a treatment liquid A to a recording medium, the treatment liquid A including water and a water-soluble organic solvent, a content of the water-soluble organic solvent being 50 parts by mass or less with respect to 100 parts by mass of the treatment liquid A;
    second coating a treatment liquid B to the recording medium after the first coating; and
    discharging an ink composition including a coloring material to the recording medium by discharging from a nozzle after the second coating,
    wherein the treatment liquid A adjusts wettability of the treatment liquid B to the recording medium and includes inorganic oxide fine particles, and
    the treatment liquid B thickens or insolubilizes the ink composition and includes at least any one of a polyvalent metal salt, an organic acid, and an organic acid salt.

2. The recording method according to claim 1, wherein the treatment liquid B includes the polyvalent metal salt.

3. The recording method according to claim 1, wherein the treatment liquid B further includes a water-soluble organic solvent.

4. The recording method according to claim 1, wherein the recording medium is a non-absorbent recording medium or a low absorbent recording medium.

5. The recording method according to claim 1, wherein a surface tension of the treatment liquid B is 18 mN/m to 45 mN/m at 25° C.

6. The recording method according to claim 1, wherein a viscosity of the treatment liquid B is 1 mPa·s to 10 mPa·s at 25° C.

7. The recording method according to claim 1, wherein in the first coating, at least any one of the resin and the inorganic oxide fine particles is coated in 0.01 g/m$^2$ to 1.0 g/m$^2$.

8. The recording method according to claim 1, wherein a concentration of cations of at least any one of the polyvalent metal salt and the organic acid in the treatment liquid B is 0.08 mol/L or less.

9. The recording method according to claim 1, wherein in the second coating, the treatment liquid B is coated on the recording medium by an ink jet method.

10. The recording method according to claim 1, wherein in the second coating, the treatment liquid B is coated on the recording medium by an ink jet method using a line head.

11. The recording method according to claim 1, further comprising:
    drying the treatment liquid A coated on the recording medium between the first coating and the second coating.

12. The recording method according to claim 1, wherein in the second coating, a total of at least one of the polyvalent metal salt, the organic acid, and the organic acid salt is coated in 0.01 g/m$^2$ to 0.5 g/m$^2$ as a solid content.

13. The recording method according to claim 1, wherein a content of the water is 30 parts by mass or more with respect to 100 parts by mass of the treatment liquid A.

* * * * *